United States Patent
Basler et al.

(10) Patent No.: US 8,631,217 B2
(45) Date of Patent: Jan. 14, 2014

(54) APPARATUS, SYSTEM, AND METHOD FOR VIRTUAL MACHINE BACKUP

(75) Inventors: Jason Ferris Basler, Los Gatos, CA (US); David George Derk, Gibsonia, PA (US); Vadzim Ivanovich Piletski, San Jose, CA (US); James Patrick Smith, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 970 days.

(21) Appl. No.: 12/037,816

(22) Filed: Feb. 26, 2008

(65) Prior Publication Data

US 2009/0216970 A1    Aug. 27, 2009

(51) Int. Cl.
*G06F 12/00* (2006.01)
*G06F 13/00* (2006.01)
*G06F 13/28* (2006.01)

(52) U.S. Cl.
USPC .................................. 711/162; 711/E12.103

(58) Field of Classification Search
USPC .......................................... 711/162, E12.103
See application file for complete search history.

(56) References Cited

U.S. PATENT DOCUMENTS

| | | | | |
|---|---|---|---|---|
| 4,584,639 A * | 4/1986 | Hardy | ............... | 726/2 |
| 6,931,544 B1 * | 8/2005 | Kienhofer et al. | ............ | 717/118 |
| 7,127,479 B2 | 10/2006 | Tsaur et al. | ................... | 707/204 |
| 7,134,041 B2 | 11/2006 | Murray et al. | ..................... | 714/4 |
| 7,197,516 B1 | 3/2007 | Hipp et al. | .................... | 707/200 |
| 7,370,164 B1 * | 5/2008 | Nagarkar et al. | ............. | 711/162 |
| 7,392,403 B1 * | 6/2008 | Munetoh | ...................... | 713/193 |
| 7,447,854 B1 * | 11/2008 | Cannon | ......................... | 711/162 |
| 7,475,419 B1 * | 1/2009 | Basu et al. | ....................... | 726/2 |
| 7,512,815 B1 * | 3/2009 | Munetoh | ...................... | 713/193 |
| 7,533,229 B1 * | 5/2009 | van Rietschote | ............. | 711/161 |
| 7,546,325 B2 * | 6/2009 | Kamei et al. | ......................... | 1/1 |
| 7,743,035 B2 * | 6/2010 | Chen et al. | ................... | 707/674 |
| 2003/0135746 A1 * | 7/2003 | Abbott et al. | ................. | 713/193 |
| 2004/0148514 A1 * | 7/2004 | Fee et al. | ...................... | 713/200 |
| 2004/0255137 A1 * | 12/2004 | Ying | ............................. | 713/193 |
| 2006/0088167 A1 | 4/2006 | Bade et al. | .................... | 380/281 |
| 2006/0129615 A1 | 6/2006 | Derk et al. | .................... | 707/204 |
| 2006/0184937 A1 | 8/2006 | Abels et al. | ....................... | 718/1 |
| 2006/0235892 A1 | 10/2006 | Kalach et al. | ................. | 707/200 |
| 2007/0005915 A1 | 1/2007 | Thompson et al. | .......... | 711/162 |
| 2007/0006018 A1 | 1/2007 | Thompson et al. | .............. | 714/6 |
| 2007/0100913 A1 | 5/2007 | Sumner et al. | ................ | 707/204 |
| 2007/0124409 A1 * | 5/2007 | Sibert | .......................... | 709/216 |

(Continued)

OTHER PUBLICATIONS

Hepner, Tivoli Storage Manage on VMware, Storage and Storage Network Symposium, Jul. 25-29, 2005, New Orleans, LA.

(Continued)

*Primary Examiner* — Sheng-Jen Tsai
(74) *Attorney, Agent, or Firm* — Kunzler Law Group (57) ABSTRACT

An apparatus, system, and method are disclosed for a virtual machine backup. A name module establishes an administrative machine name for a virtual machine. A space module associates at least one administrative name space with the administrative machine name. A backup module backs up files belonging to the virtual machine using a backup proxy, wherein the files are segregated under the administrative machine name and are accessible using only a secure key belonging to the virtual machine and without using a backup proxy secure key. A mask module masks out pathname components for each backup file pathname so that the backup file pathname is equivalent to a virtual machine file pathname.

14 Claims, 6 Drawing Sheets

(56) References Cited

U.S. PATENT DOCUMENTS

| | | | |
|---|---|---|---|
| 2007/0136381 A1 | 6/2007 | Cannon et al. | |
| 2007/0192839 A1* | 8/2007 | Fee et al. | 726/4 |
| 2007/0208918 A1* | 9/2007 | Harbin et al. | 711/162 |
| 2007/0226786 A1* | 9/2007 | Berger et al. | 726/9 |
| 2007/0294496 A1* | 12/2007 | Goss et al. | 711/163 |
| 2007/0300069 A1* | 12/2007 | Rozas | 713/176 |
| 2008/0016127 A1* | 1/2008 | Field | 707/202 |
| 2008/0066143 A1* | 3/2008 | Charles Tai et al. | 726/1 |
| 2008/0148341 A1* | 6/2008 | Ferguson et al. | 726/1 |
| 2008/0244685 A1* | 10/2008 | Andersson et al. | 726/1 |
| 2008/0260156 A1* | 10/2008 | Baba et al. | 380/277 |
| 2008/0270806 A1* | 10/2008 | Nakamura | 713/190 |
| 2008/0294859 A1* | 11/2008 | Nguyen | 711/162 |
| 2009/0154709 A1* | 6/2009 | Ellison | 380/282 |
| 2009/0210427 A1* | 8/2009 | Eidler et al. | 707/10 |
| 2009/0276771 A1* | 11/2009 | Nickolov et al. | 717/177 |
| 2009/0328225 A1* | 12/2009 | Chambers et al. | 726/26 |
| 2010/0169392 A1* | 7/2010 | Lev Ran et al. | 707/827 |
| 2011/0173295 A1* | 7/2011 | Bakke et al. | 709/217 |

OTHER PUBLICATIONS

VMware Consolidated Backup Centralized backup software for virtual machines, VMware, Inc.

Consolidated Backup in VMware Infrastructure 3, VMware, Inc., pp. 1-5.

* cited by examiner

APPARATUS, SYSTEM, AND METHOD FOR VIRTUAL MACHINE BACKUP

BACKGROUND OF THE INVENTION

1. Field of the Invention

This invention relates to a backup and more particularly relates to backing up virtual machines.

2. Description of the Related Art

Virtual machine software is often used to allow a single computer to execute a plurality of virtual machines. Each virtual machine may appear to a user or other computer as a unique physical computer. Thus each virtual machine may execute a unique operating system and/or have a unique security configuration. In addition, each virtual machine may store data to a virtual disk, wherein each virtual disk is embodied in one or more physical hard disks.

The use of virtual machines may reduce computing costs by allowing a single physical computer to perform the functions of multiple computers. For example, a first virtual machine may function as a database server while a second virtual machine may function as a Web server. Each virtual machine may be configured with an appropriate operating system and security configuration. However, both virtual machines may execute on the same computer.

Because virtual machines often store and process critical data, virtual machines need to be backed up. For example, a backup proxy may back up data from a plurality of virtual machines to a data storage system.

Unfortunately, the backup proxy typically stores the backed up data as the data is seen by the backup proxy. For example, all the data from a plurality of virtual disks embodied by a single physical hard disk may be stored together. Thus although each virtual disk may have unique security controls, the backup data may all share the security controls of the backup proxy. In addition, the pathnames for the data may reflect those names seen by the backup proxy rather than the virtual disk names.

SUMMARY OF THE INVENTION

From the foregoing discussion, there is a need for an apparatus, system, and method that backs up virtual machines. Beneficially, such an apparatus, system, and method would backup virtual machines while preserving security controls for each virtual machine.

The present invention has been developed in response to the present state of the art, and in particular, in response to the problems and needs in the art that have not yet been fully solved by currently available backup methods. Accordingly, the present invention has been developed to provide an apparatus, system, and method for backing up a virtual machine that overcome many or all of the above-discussed shortcomings in the art.

The apparatus to back up a virtual machine is provided with a plurality of modules configured to functionally execute the steps of establishing an administrative machine name, associating at least one administrative name space, backing up files, and masking out pathname components. These modules in the described embodiments include a name module, a space module, a backup module, and a mask module.

The name module establishes an administrative machine name for a virtual machine. The space module associates at least one administrative name space with the administrative machine name. The backup module backs up files belonging to the virtual machine using a backup proxy, wherein the files are segregated under the administrative machine name and are accessible using only a secure key belonging to the virtual machine and without using a backup proxy secure key. The mask module masks out pathname components for each backup file pathname so that the backup file pathname is equivalent to a virtual machine file pathname.

A system of the present invention is also presented to back up a virtual machine. The system may be embodied in a virtual machine backup system. In particular, the system, in one embodiment, includes a computer, a backup proxy, a name module, a space module, a backup module, and a mask module.

The computer executes a plurality of virtual machines. The backup proxy backs up the plurality of virtual machines. The name module establishes an administrative machine name for a virtual machine. The space module associates at least one administrative name space with the administrative machine name. The backup module backs up files belonging to the virtual machine using a backup proxy. The files are segregated under the administrative machine name and are accessible using only a secure key belonging to the virtual machine and without using a backup proxy secure key. The mask module masks out pathname components for each backup file pathname so that the backup file pathname is equivalent to a virtual machine file pathname.

A method of the present invention is also presented for backing up a virtual machine. The method in the disclosed embodiments substantially includes the steps to carry out the functions presented above with respect to the operation of the described apparatus and system. In one embodiment, the method includes establishing an administrative machine name, associating at least one administrative name space, backing up files, and masking out pathname components.

A name module establishes an administrative machine name for a virtual machine. A space module associates at least one administrative name space with the administrative machine name. A backup module backs up files belonging to the virtual machine using a backup proxy, wherein the files are segregated under the administrative machine name and are accessible using only a secure key belonging to the virtual machine and without using a backup proxy secure key. A mask module masks out pathname components for each backup file pathname so that the backup file pathname is equivalent to a virtual machine file pathname. Thus the method enables efficient and complete backing up virtual machines.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention provides an apparatus, a system, and a method for virtual machine backup using a backup proxy.

Beneficially, such an apparatus, a system, and a method would allow the backup data of the virtual machine to maintain the virtual machines security configuration and not share the security controls of the backup proxy. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
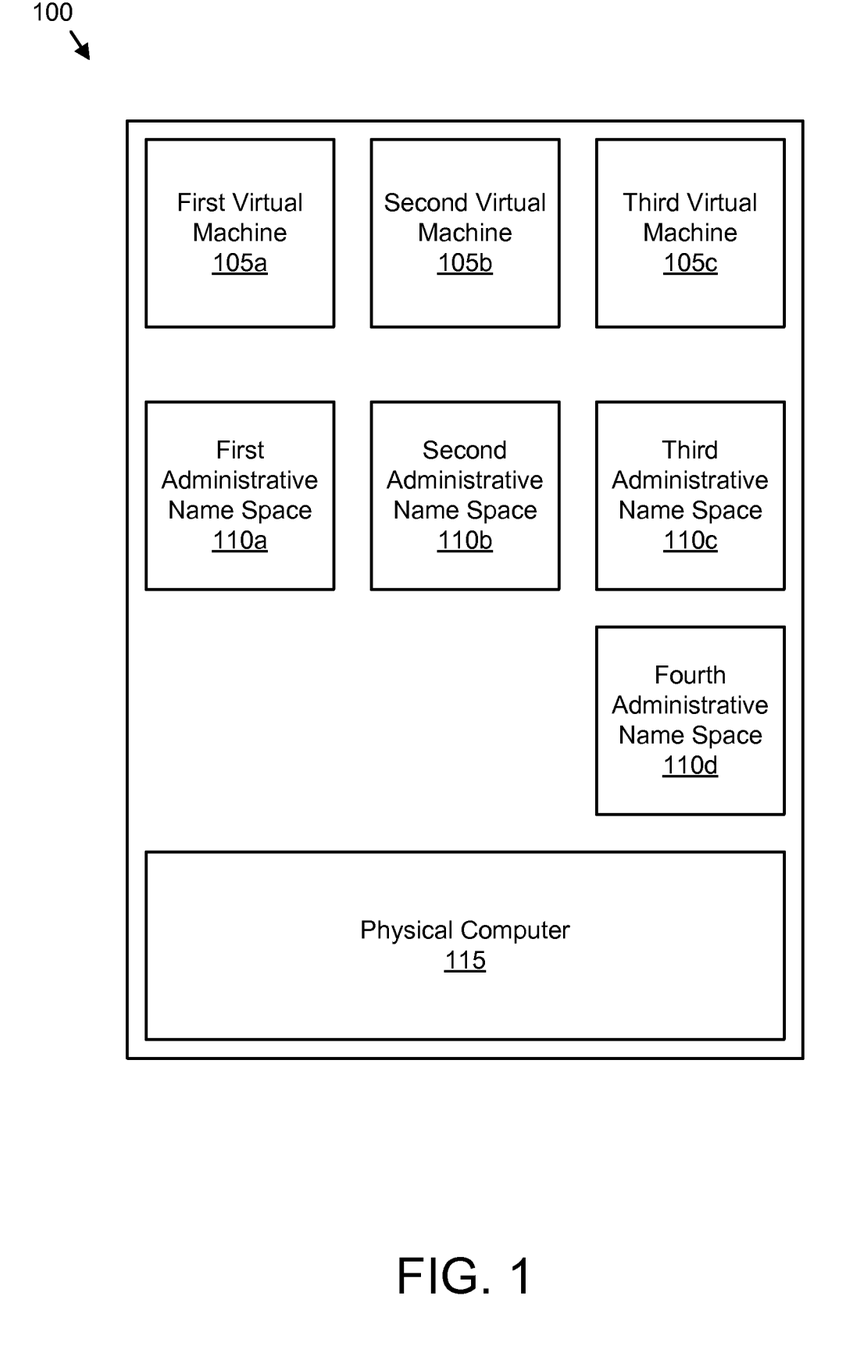
FIG. 1 is a schematic block diagram illustrating one embodiment of a virtualized computer in accordance with the present invention.

FIG. 1 is a schematic block diagram illustrating one embodiment of a virtualized computer 100 of the present invention. The virtualized computer 100 includes a plurality of virtual machines 105a-c, a plurality of administrative name spaces 100a-d, and a physical computer 115. Although for simplicity, three (3) virtual machines 105a-c, four (4) administrative name spaces 100a-d, and one physical computer 115 are shown, any number may be employed in the virtualized computer 100.

The physical computer 115 may be a server, computer workstation, storage controller, or the like. The physical computer 115 may include one or more x86-based central processing units, Power PC-based central processing units, system buses, random access memories (RAMs), hard disks, network modules, cache memories, adapters, binary input/output system (BIOS), and the like. These components may be fabricated of semiconductor gates on one or more semiconductor substrates.

Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The physical computer 115 may also comprise a plurality of computer program products such as an operating system (OS) selected from LINUX®, WINDOWS®, AIX® or the like, one or more hosted virtualization platforms, and the like. The computer program products may be tangibly stored in one or more memory modules. For example, the computer program products may be stored in the hard disk of the physical computer 115.

In an embodiment, each virtual machine 105a-c is configured as a VMWARE® virtual machine. The physical computer 115 executes the plurality of virtual machines 105a-c. For example, the physical computer 115 may use WINDOWS® and VMWARE® ESX server to create and execute the plurality of virtual machines 105a-c.

The VMWARE® ESX server may be a bare metal hypervisor or a virtual machine monitor (VMM) that may automatically partition the physical computer 115 in the plurality of virtual machines 105a-c from VMWARE®. Each virtual machine 105a-c created by partitioning the physical computer 115 may represent a complete virtual system, with processor resources, memory resources, network resources, storage resources, BIOS and the like.

The plurality of virtual machines 105a-c may also share physical resources and run side by side on the same physical computer 115. An OS such as LINUX®, WINDOWS®, AIX®, or the like may run unmodified in the plurality of virtual machines 105a-c. For example, the OSs such as AIX®, WINDOWS®, and LINUX® may be executed in the first virtual machine 105a, second virtual machine 105b, and third virtual machine 105c respectively.

Each virtual machine 105a-c may be defined by a virtual machine data. The virtual machine data may include a plurality of virtual disks, Raw Device Mapping (RDMs), configuration files, and the like. For example, the first virtual machine 105a may comprise files such as .vmdk virtual disk files, virtual machine configuration .vmx files, log files, or the like.

VMWARE® File System (VMFS) may be used to store the plurality of virtual machines 105a-c. The VMFS may allow a file system on physical small computer small interface (SCSI) disks and partitions. The VMFS may store large files such as virtual disk images for the plurality of virtual machines 105a-c.

The VMFS may support a plurality of directories to store the plurality of virtual machines 105a-c. For example, the VMFS may support a first directory that may contain all files that comprise the first virtual machine 105a.

Each virtual machine 105a-c may be identified by an administrative machine name. Each administrative machine name may be configured as a Tivoli Storage Manager™ (TSM) nodename. A TSM backup program may automatically create the administrative name configured as a TSM nodename corresponding to each virtual machine 105a-c. For example, the TSM may create the TSM nodename for each virtual machine 105a-c, taking a resource name as an input parameter, as is well known to those skilled in the art.

Each administrative name space 110a-d may include a virtual disk. The virtual disk may be embodied in one or more physical hard disks of the physical computer 115. Alternatively, the virtual disk may be embodied in one or more hard disks of a storage subsystem such as a storage area network (SAN). In an embodiment, there is at least one virtual disk in at least one administrative name space 110a-d. For example, the first virtual machine 105a and second virtual machine 105b are shown associated with the first administrative name space 110a and second administrative name space 110b respectively and the third virtual machine 105c with the third and fourth administrative name spaces 110c-d.

Figure 2:
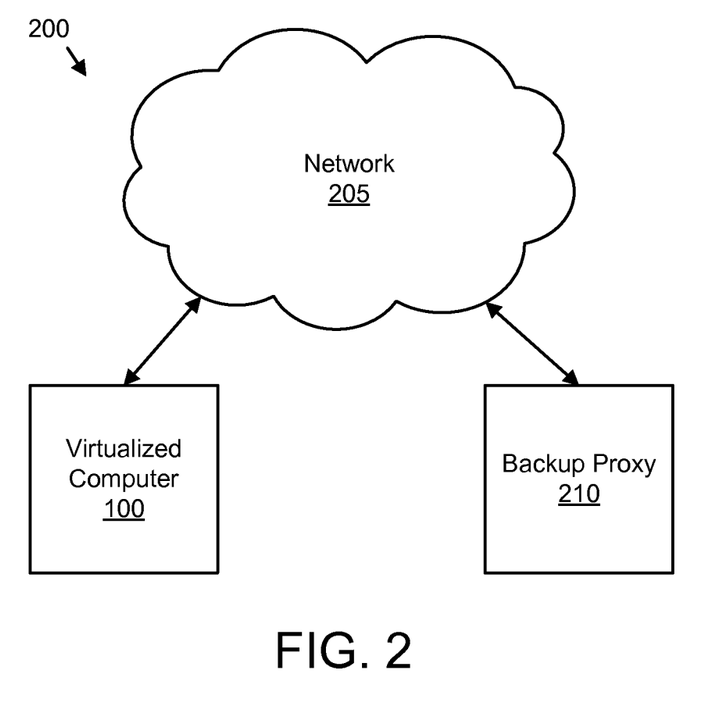
FIG. 2 is a schematic block diagram illustrating one embodiment of a system for dispatching a virtual machine for backup in accordance with the present invention.

FIG. 2 is a schematic block diagram illustrating one embodiment of a system 200 for dispatching a virtual machine for backup in accordance with the present invention. The virtual system 200 includes a virtualized computer 100, a network 205, and a backup proxy 210. The virtualized computer 100 may be the virtualized computer 100 of FIG. 1. The description of system 200 refers to elements of FIGS. 1, like numbers referring to like elements. Although for simplicity one network 205, one virtualized computer 100 and one backup proxy 210 are shown, any number may be employed in the system 200.

The backup proxy 210 is configured to backup the plurality of virtual machines 105a-c. The backup proxy 210 may perform local area network (LAN) free file level and/or image level backup for the plurality of virtual machines 105a-c. In an embodiment, the backup proxy 210 employs VMWARE® Consolidated Backup. The backup proxy 210 may also employ third party backup software to back up the plurality of virtual machines 105a-c. The third party backup software may be selected from an International Business Machines Corporation (IBM) TSM, EMC NetWorker, Symantec Backup Exec, Veritas NetBackup, or the like.

The backup proxy 210 may be a server, computer workstation, storage controller, or the like. The backup proxy 210 may comprise one or processors, volatile and non-volatile memories, system buses, adapters, and the like. For example, the backup proxy 210 may comprise one or more Fibre Channel host bus adapters (FCHBAs) to connect to Fibre Channel storage area network (FCSAN) arrays hosting VMware File System (VMFS) or Raw Device Mapping (RDM).

The backup proxy 210 may communicate with the virtualized computer 100 over the network 205 for dispatching the virtual machine 105a-c for the file-level and/or image-level virtual machine backup. The network 205 may be selected from a SAN, a token ring network, or the like. The communication over the network 205 between the backup proxy 210 and the virtualized computer 100 may be through wires, FCs, cables, and/or wireless.

Figure 3:
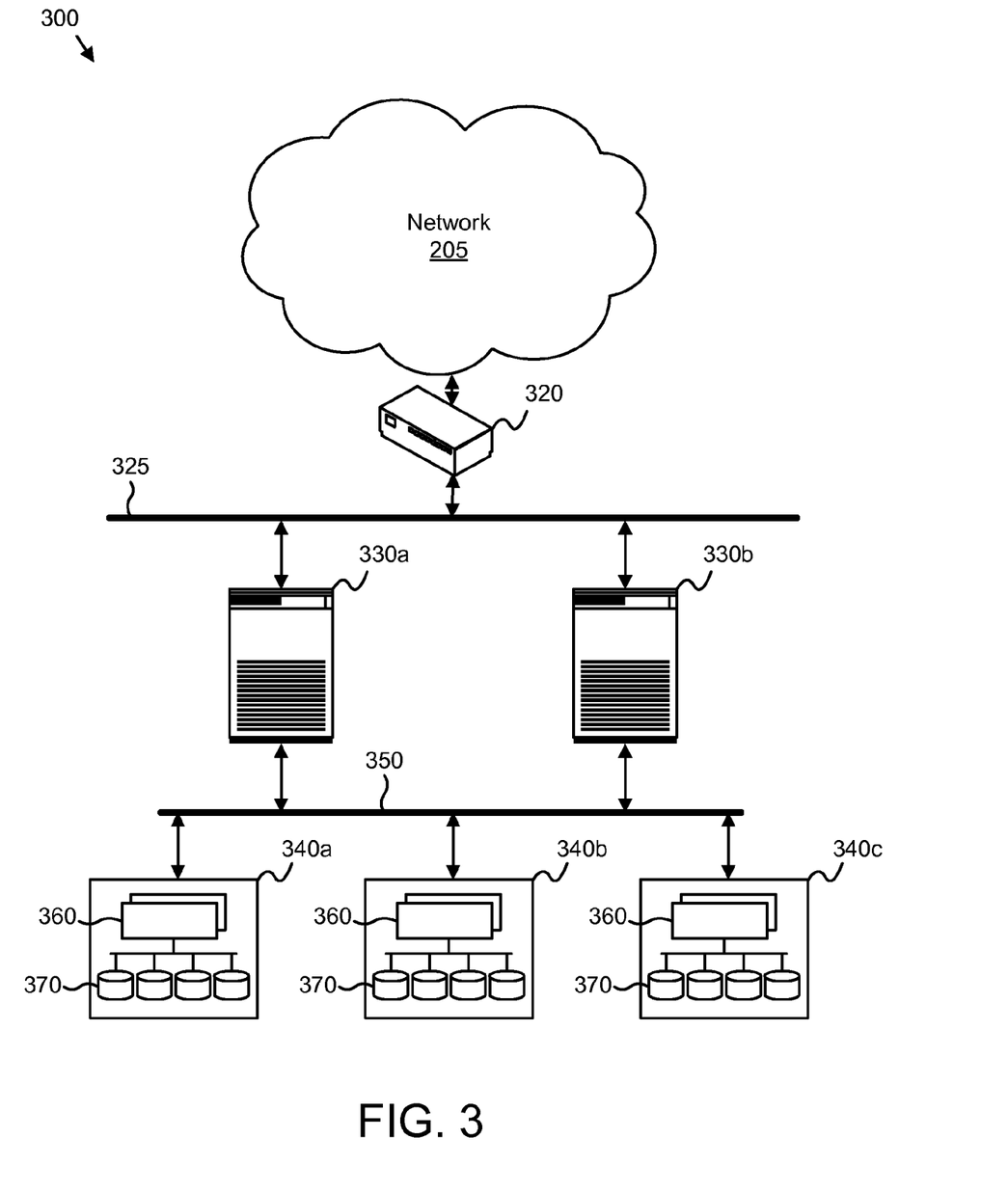
FIG. 3 is a schematic block diagram illustrating one embodiment of a virtual machine backup system of the present invention.

FIG. 3 is a schematic block diagram illustrating one embodiment of a virtual machine backup system 300 in accordance with the present invention. The description of system 300 refers to elements of FIGS. 1-2, like numbers referring to like elements. The virtual machine backup system 300 includes the network 205, a router 320, an internal network 325, a plurality of servers 330a-b, a storage communication channel 350, and a plurality of storage subsystems 340a-c. Although for simplicity, one network 205, one router 320, one internal network 325, two (2) servers 330a-b, one storage communication channel 350, and three (3) storage subsystems 340a-c are shown, any number may be employed in the system 300.

In an embodiment, the virtual machine backup system 300 provides backup to the plurality of virtual machines 105a-c of the virtualized computer 100 of FIG. 1. Any of the servers 330a-b may be configured as a server running a virtualized computer and the other servers 330a-b may function as the backup proxy 210. For example, the second server 330b may be the backup proxy 210 of FIG. 2 and the first server 330a may be the virtualized computer 100 of FIG. 1.

The plurality of servers 330a-b may also be configured as mainframe computers, blade centers comprising multiple blade servers, and the like. Although for simplicity one network 205, one router 320, one internal network 325, two (2) servers 330a-b, one storage communication channel 350, and three (3) storage subsystems 340a-c are shown, any number those may be employed in the system 300.

Each storage subsystem 340 includes a plurality of storage controllers 360 and a plurality of storage devices 370. The plurality of storage devices 370 may be configured as hard disk drives, optical storage devices, magnetic tape drives, micromechanical storage devices, holographic storage devices, semiconductor storage devices, or the like.

The plurality of storage devices 370 may store backup files for the corresponding virtual machine 105a-c using a file system. For example, the VMWARE® Consolidated Backup may use VMWARE® File System (VMFS), NTFS, and FAT to store the backup files of a certain size associated with each of the corresponding virtual machine 105a-c in appropriate directories. The backup proxy 210 may have access to each virtual disk storing the particular virtual machine 105a-c as is well known to those skilled in the art.

The backup proxy 210 may be accessed using a unique backup proxy secure key. The unique backup proxy secure key may be generated by a method known to those skilled in the art.

In a particular example, the server 330b employed as the backup proxy 210 may back up the first virtual machine 105a of the server 330a employed as the virtualized computer 100 by communicating through the network 205, the router 320, the internal network 325, the storage communication channel 350, and the storage controller 360 to one of the storage device 370 of a storage subsystem 340 and automatically create and store the corresponding backup files for the first virtual machine 105a in appropriate directories of a storage subsystem 340 by one or more methods known to those skilled in the art.

All communication between the router 320 and the network 205 may be through cables, optical fibers, and/or wireless connections well known to those skilled in the art. Additionally, all communication between the internal network 325, the plurality of servers 330a-b, the storage communication channel 350, and the plurality of storage subsystems 340 may be through cables, optical fibers, and/or wireless connections well known to those skilled in the art.

Figure 4:
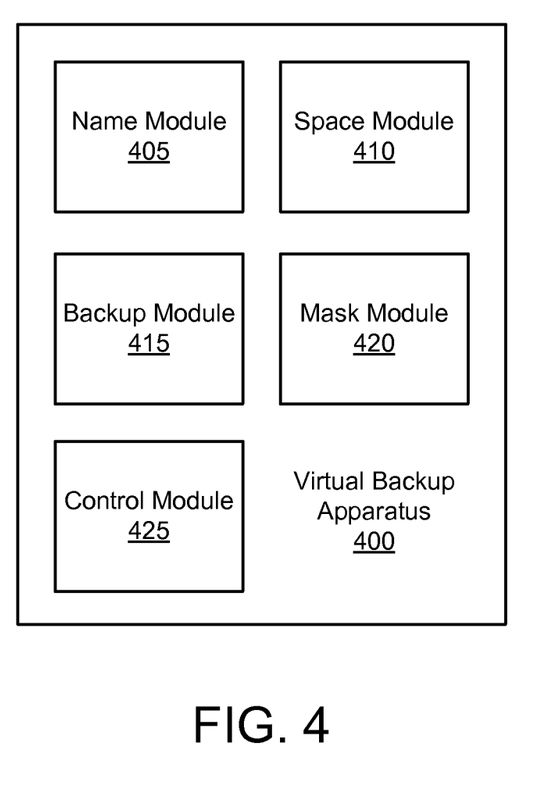
FIG. 4 is a schematic block diagram illustrating one embodiment of a virtual machine backup apparatus of the present invention.

FIG. 4 is a schematic block diagram illustrating one embodiment of a virtual machine backup apparatus 400 of the present invention. The apparatus 400 may be embodied in the backup proxy 210 of the FIG. 2. The description of apparatus 400 refers to elements of FIGS. 1-3, like numbers referring to like elements. The apparatus 400 includes a name module 405, a space module 410, a backup module 415, and a mask module 420. The apparatus 400 may further include a control module 425.

The name module 405 establishes an administrative machine name for a virtual machine 105a-c. The administrative machine name for the virtual machine 105a-c may allow administrative privileges to the user and/or the backup proxy 210. For example, the name module 405 may establish a third administrative machine name for accessing the third virtual machine 105c. The name module 405 may be a computer program product executed on the backup proxy 210.

The space module 410 associates at least one administrative name space 110a-d with the administrative machine name. The administrative name space 110a-d may include a virtual disk. The virtual disk may be embodied in one or more physical hard disks of the physical computer 115. A physical hard disk of the physical computer 115 may be partitioned for example, in four (4) virtual disks named 'A', 'B', 'D', and 'F'. For example, the space module 410 may associate two (2) virtual disks named 'D', and 'F' with third administrative name. The space module 410 may be a computer program product executed on the backup proxy 210.

In an embodiment, a single command initiates the backup of a plurality of machines. The backup module 415 backs up files belonging to the virtual machine 105a-c using a backup proxy 210. The files are segregated under each administrative machine name and are accessible using only a secure key belonging to the virtual machine 105a-c. In addition, the files may be accessed without using a backup proxy secure key. In one embodiment, the backup proxy secure key will not access the backup files. The backup proxy 210 may be the backup proxy 210 of FIG. 2. The backup module 415 may be a computer program product executed on the backup proxy 210.

The mask module 420 masks out pathname components for each backup file pathname so that the backup file pathname is equivalent to a virtual machine file pathname. The mask module 420 may be a computer program product executed on the backup proxy 210.

In an embodiment, the control module 425 discovers each virtual machine 105a-c eligible for backup. For example, the control module 425 may discover the first virtual machine 105a eligible for backup. The control module 425 may further prepare the virtual machine 105a-c for backup. For example, the control module 425 may prepare the first virtual machine 105a for backup.

In an embodiment, the control module 425 further creates a snapshot for each eligible virtual machine 105a-c. For example, the control module 425 may create an incremental snapshot of first virtual machine 105a for backup. The control module 425 may further thaw the snapshot for each eligible virtual machine 105a-c. The control module 425 may be a computer program product executed on the backup proxy 210.

The schematic flow chart diagram that follows is generally set forth as logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
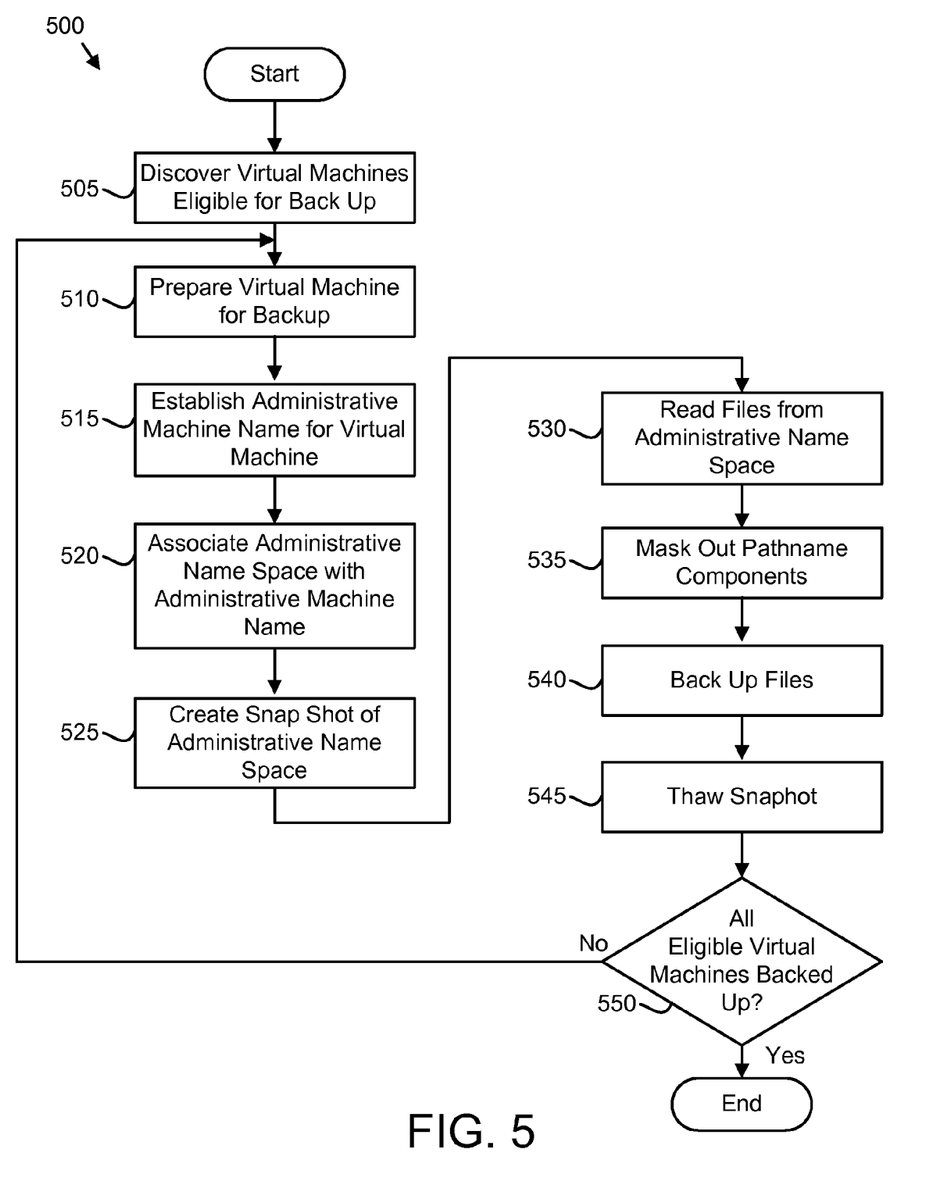
FIG. 5 is a schematic flow chart diagram illustrating one embodiment of a method for backing up a virtual machine of the present invention.

FIG. 5 is a schematic flow chart diagram illustrating one embodiment of a method 500 for backing up a virtual machine of the present invention. The method 500 substantially includes the steps to carry out the functions presented above with respect to the operation of the described apparatus 400, system 200 and systems 300 of FIGS. 4, 2 and 3 respectively. The description of method 500 refers to elements of FIGS. 1-4, like numbers referring to the like elements.

The method 500 starts and in an embodiment a single command initiates the backup of the plurality of virtual machines 105a-c. The control module 425 may discover 505 each virtual machine 105a-c eligible for backup. The eligibility of the virtual machine 105a-c for backup may depend on a backup schedule. The user may set the file-level backup for once everyday day at eight (8) A. M. for all the virtual machines 105a-c executing WINDOWS® and/or the image-level backup once every seventh day at eight (8) P. M. for all the virtual machines 105a-c executing any OS. For example, the control module 425 may discover 505 the first virtual machine 105a is eligible for backup at eight (8) A. M. In another example, the control module 425 may discover 505 the third virtual machine 105c eligible for backup every seventh day at eight (8) P. M.

The control module 425 may prepare 510 the virtual machine 105a-c for backup. Preparation of the virtual machine 105a-c for backup may comprise steps such as quiescing the VMFS, NTFS, or FAT inside the virtual machine 105a-c, putting the virtual machine 105a-c in a snapshot mode, ensuring that the proxy server 210 has access to the virtual machine 105a-c, and the like. For example, the control module 425 may automatically prepare 510 the first virtual machine 105a for backup everyday at eight (8) A. M. and the third virtual machine 105c for backup every seventh day at eight (8) P. M. by carrying out one or more mentioned steps.

The name module 405 establishes 515 an administrative machine name for the virtual machine 105a-c. In an embodiment, the name module 405 establishes 515 the administrative machine name using a TSM asnodename command. The TSM asnodename option may be employed as is well known to those skilled in the art. For example, the name module 405 may automatically establish 515 the administrative machine name configured as with a secure key 'CFR319f' for the first virtual machine 105a and administrative machine name configured as 'WWVM=3' with a secure key 'CFR321f' for the third virtual machine 105c. Alternatively, a configuration file may provide the secure keys.

The space module 410 associates 520 at least one administrative name space 110a-d with the administrative machine name. In an embodiment, the space module 410 further establishes at least one virtual disk in at least one administrative name space 110a-d. For example, the space module 410 may associate 520 the virtual disk named 'A' and the virtual disk named 'D' with the administrative machine name for the third virtual machine 105c.

The control module 425 may create 525 a snapshot of the eligible virtual machine 105a-c. For example, the control module 425 may invoke an interface that copies all modified files for the first virtual machine 105a into the snapshot mode to create 525 the snapshot for any later writes.

The third party backup software may read 530 one or more files. For example, the backup proxy 210 may access the first virtual machine 105a so that the third party backup software may read 530 the one or more modified files from the snapshot.

The mask module 420 masks out 535 pathname components for each backup file pathname so that the backup file pathname is equivalent to the virtual machine file pathname. In an embodiment, the mask module 420 masks out 535 the pathname components using the TSM snapshotroot option. The TSM snapshotroot option may allow masking out 535 extra pathname components that result from mapping a snapshot of a virtual disk to the backup proxy.

For example, if the data of the virtual disk file .vm1dk.abc.txt. of the first virtual machine 105a is to be backed up and stored on the first storage device 370 of the first storage subsystem 340a, then the backup file pathname may be configured as a:\vcbmount\vm1dk.abc.text. Continuing with the example, above the mask module 420 may mask out 535 out pathname components for the pathname, so that the backup file pathname is equivalent to the first virtual machine file pathname a: vm1dk.abc.text.

The backup module 415 backs up 540 files belonging to the virtual machine 105a-c using the backup proxy 210. The files are segregated under the administrative machine name and are accessible using only the secure key belonging to the virtual machine 105a-c and without using the backup proxy secure key. The backup proxy 210 may employ the VMWARE® Consolidated Backup. In an embodiment, the backup is an incremental backup. The incremental backup may allow backup of only those one or more files that may have been changed and/or updated since last backup.

For example, the virtual disk file .vm1dk.abc.txt. may be segregated under the administrative machine name configured as 'WWVM=1' with the secure key 'CFR319f' associated with the virtual disk named 'A'. The virtual disk file .vmldk.abc.txt. of the first virtual machine 105a may be accessible using only the secure key configured as 'CFR319f' that belongs to the first administrative machine name configured as 'WWVM–1' and without using the backup proxy secure key 'BGT45CF'. The backup module 415 may use the pathname a:\vcbmount\vm1dk.abc. to back up 540 the data of the virtual disk file .vm1dk.abc.txt. of the first virtual machine 105a.

The control module 425 may thaw 545 the snapshot for each eligible virtual machine 105a-c. For example, the control module 425 may automatically thaw 545 the snapshot and allow changes to files for the first virtual machine 105a.

The control module 425 may further determine 550 if all eligible virtual machines 105a-c backed up. For example, the control module 425 may automatically determine 550 that the eligible first virtual machine 105a and the third virtual machine 105c are backed up.

If the control module 425 determines 550 that all eligible virtual machines 105a-c are not backed up, the control module 425 loops to prepare 510 the eligible virtual machine 105a-c for backup. If the control module 425 determines 550 that all eligible virtual machine 105a-c backed up, the method 500 ends. Thus the method 500 would enable efficient and complete backup of virtual machines 105a-c while maintaining the security configuration of each virtual machine 105a-c.

Figure 6:
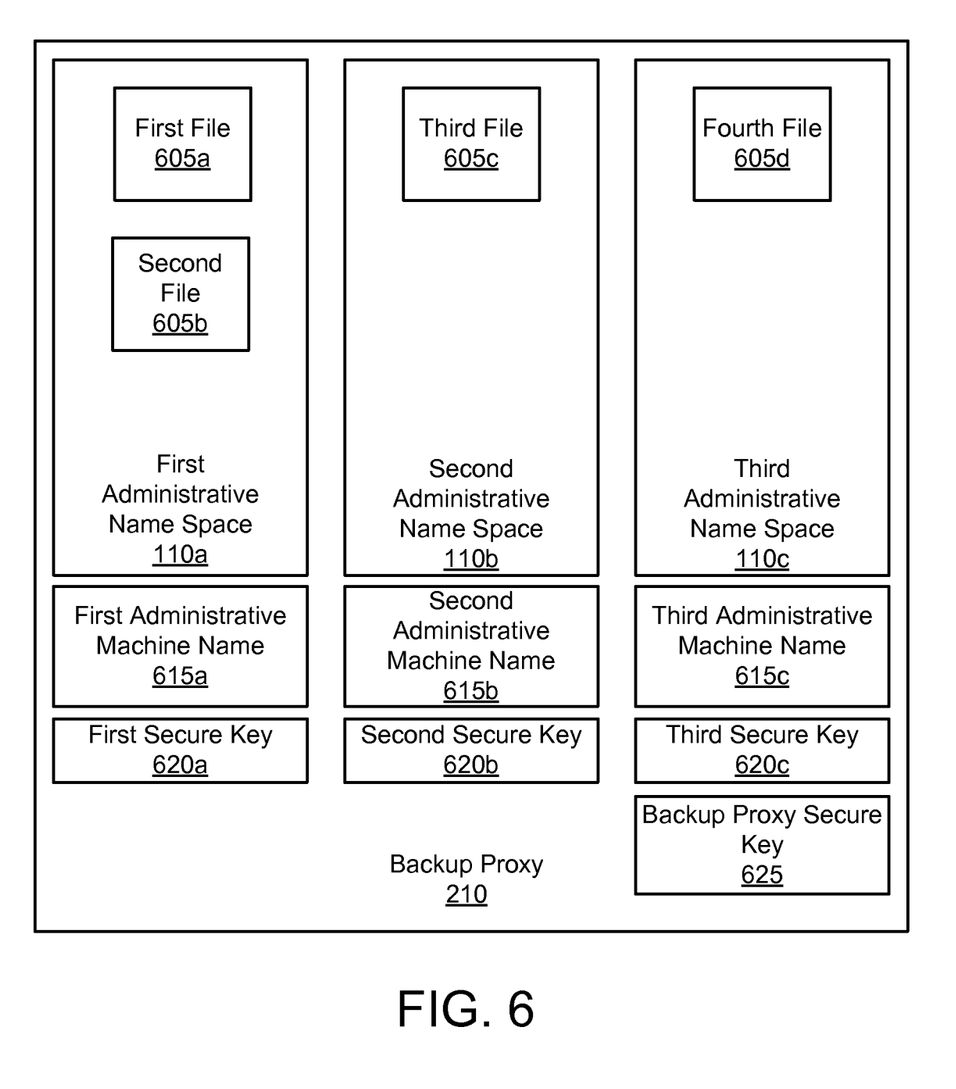
FIG. 6 is a schematic drawing illustrating one embodiment of a backup proxy of the present invention.

FIG. 6 is a schematic drawing illustrating one embodiment of a backup proxy 210 of the present invention. The description of backup proxy 210 refers to elements of FIGS. 1-5, like numbers referring to like elements. The backup proxy 210 includes a plurality of administrative machine names 615a-c, a plurality of secure keys 620a-c, a plurality of administrative name spaces 110a-c, and a backup proxy key 625. Although for simplicity, only three (3) administrative machine names 615a-c, three (3) secure keys 620a-c, three (3) administrative name spaces 110a-c, and one backup proxy key 625 are shown, any number may be employed by the backup proxy 210.

In the shown embodiment, the first administrative name space 110a is associated with the first administrative machine name 615a and the first secure key 620a. The second administrative name space 110b is associated with the second administrative machine name 615b and the second secure key 620b. The third administrative name space 110c is associated with the third administrative machine name 615c and the third secure key 620c.

Further, a first file 605a and a second file 605b, third file 605c, and a fourth file 605d are shown segregated under the first administrative machine name 615a, the second administrative machine name 615b, and the third administrative machine name 615c respectively. The first and second files 605a-b may be accessible using the first secure key 620a. The third file 605c may be accessible using the second secure key 620b. The fourth file 605d may be accessible using the third secure key 620c. The files 605a-d may not be accessible using the backup proxy secure key 625.

Thus an administrator with the backup proxy secure key 625 may not access the files 605a-d. In addition, the owner of the first virtual machine 105a and first administrative name space 110a may access the first and second files 605a-b, but may not access the third file 605c. The present invention maintains the security configuration of each virtual machine 105a-c.

The present invention provides an apparatus, a system, and a method for virtual machine backup using a backup proxy. Beneficially, such an apparatus, a system, and a method would allow the backup data of the virtual machine to maintain a security configuration and all share the security controls of the backup proxy. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer useable medium having a computer readable program stored on a tangible storage device, wherein the computer readable program when executed on a computer causes the computer to:

establish an administrative machine name for a virtual machine, the virtual machine comprising a unique security configuration, the security configuration comprising a secure key distinct from the administrative machine name and providing secure access to the virtual machine;

associate at least one administrative name space with the administrative machine name;

quiesce files belonging to the virtual machine;

create an incremental snapshot for the virtual machine;

back up the files belonging to the virtual machine to the at least one administrative machine name space with the administrative machine name and the secure key using a backup proxy with a security control comprising a backup proxy secure key used to access the backup proxy, the security control distinct from the security configuration, wherein the files are segregated under the administrative machine name and are only accessible using the secure key under the security configuration of the virtual machine;

mask out pathname components from the at least one administrative machine name space for each backup file pathname so that the backup file pathname is equivalent to a virtual machine file pathname; and thaw the snapshot for the virtual machine.

2. The computer program product of claim 1, the computer readable program further causing the computer to discover each virtual machine eligible for backup.

3. The computer program product of claim 2, the computer readable program further causing the computer to prepare the virtual machine for backup.

4. The computer program product of claim 3, wherein a single command initiates the backup of a plurality of virtual machines.

5. The computer program product of claim 1, the computer readable program further causing the computer to establish at least one virtual disk in at least one administrative name space.

6. The computer program product of claim 1, the computer readable program further causing the computer to establish the administrative machine name using a Tivoli Storage Manager™ asnodename option compatible with a latest version of Tivoli Storage Manager software on Feb. 26, 2008.

7. The computer program product of claim 1, the computer readable program further causing the computer to mask out the pathname components using a Tivoli Storage Manager™ snapshotroot option compatible with a latest version of Tivoli Storage Manager software on Feb. 26, 2008.

8. An apparatus to back up a virtual machine, the apparatus comprising:
a storage device storing a computer readable program;
a processor executing the computer readable program, the computer readable program comprising:
a name module establishing an administrative machine name for a virtual machine, the virtual machine comprising a unique security configuration, the security configuration comprising a secure key distinct from the administrative machine name and providing secure access to the virtual machine;
a space module associating at least one administrative name space with the administrative machine name;
a backup module quiescing files belonging to the virtual machine, creating an incremental snapshot for the virtual machine, and backing up the files belonging to the virtual machine to the at least one administrative machine name space with the administrative machine name and the secure key using a backup proxy with a security control comprising a backup proxy secure key used to access the backup proxy, the security control distinct from the security configuration, wherein the files are segregated under the administrative machine name and are only accessible using the secure key under the security configuration of the virtual machine and thawing the snapshot for the virtual machine; and
a mask module masking out pathname components from the at least one administrative machine name space for each backup file pathname so that the backup file pathname is equivalent to a virtual machine file pathname.

9. The apparatus of claim 8, the executable code further comprising a control module to discover each virtual machine eligible for backup.

10. The apparatus of claim 9, the control module further preparing the virtual machine for backup.

11. The apparatus of claim 10, wherein a single command initiates the backup of a plurality of virtual machines.

12. A method for deploying computer infrastructure, comprising integrating a computer readable program stored on a tangible storage device into a computing system, wherein the program executed by the computing system performs the following:
discovering each virtual machine eligible for backup;
preparing each virtual machine for backup;
establishing an administrative machine name for each virtual machine, each virtual machine comprising a unique security configuration, the security configuration comprising a secure key distinct from the administrative machine name and providing secure access to the virtual machine;
associating at least one administrative name space with each administrative machine name;
quiescing files belonging to the virtual machine;
creating an incremental snapshot for the virtual machine;
backing up the files belonging to each virtual machine to the at least one administrative machine name space with the administrative machine name and the secure key using a backup proxy with a security control comprising a backup proxy secure key used to access the backup proxy, the security control distinct from the security configuration, wherein the files are segregated under each administrative machine name and are only accessible using the secure key under the security configuration of the virtual machine;
masking out pathname components from the at least one administrative machine name space for each backup file pathname so that the backup file pathname is equivalent to a virtual machine file pathname; and
thawing the snapshot for the virtual machine.

13. The method of claim 12, wherein a single command initiates the backup of a plurality of virtual machines.

14. A system to back up a virtual machine, the system comprising:
a computer executing a plurality of virtual machines;
a backup proxy backing up the plurality of virtual machines;
a name module establishing an administrative machine name for each virtual machine, each virtual machine comprising a unique security configuration, the security configuration comprising a secure key distinct from the administrative machine name and providing secure access to the virtual machine;
a space module associating at least one administrative name space with each administrative machine name;
a backup module quiescing files belonging to the virtual machine, creating an incremental snapshot for the virtual machine, and backing up the files belonging to each virtual machine to the at least one administrative machine name space with the administrative machine name and the secure key using a backup proxy with a security control comprising a backup proxy secure key used to access the backup proxy, the security control distinct from the security configuration, wherein the files are segregated under the administrative machine name and are only accessible using the secure key under the security configuration of each virtual machine and thawing the snapshot for the virtual machine; and a mask module masking out pathname components from the at least one administrative machine name space for each backup file pathname so that the backup file pathname is equivalent to a virtual machine file pathname, wherein each module is embodied in a storage device storing a computer readable program and a processor executing the computer readable program.

* * * * *